(12) United States Patent
Mower et al.

(10) Patent No.: US 10,126,506 B2
(45) Date of Patent: Nov. 13, 2018

(54) APPARATUS AND METHODS FOR LOCKED QUANTUM COMMUNICATION USING PHOTONIC INTEGRATED CIRCUITS

(71) Applicant: MASSACHUSETTS INSTITUTE OF TECHNOLOGY, Cambridge, MA (US)

(72) Inventors: Jacob C. Mower, Cambridge, MA (US); Jelena Notaros, Cambridge, MA (US); Mikkel Heuck, Cambridge, MA (US); Dirk Robert Englund, Cambridge, MA (US); Cosmo Lupo, Leeds (GB); Seth Lloyd, Wellesley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/486,088

(22) Filed: Apr. 12, 2017

(65) Prior Publication Data
US 2017/0293082 A1 Oct. 12, 2017

Related U.S. Application Data

(60) Provisional application No. 62/321,261, filed on Apr. 12, 2016.

(51) Int. Cl.
*H04B 10/40* (2013.01)
*G02B 6/293* (2006.01)
(Continued)

(52) U.S. Cl.
CPC ..... *G02B 6/29343* (2013.01); *G02B 6/29395* (2013.01); *G02F 1/2257* (2013.01); *H04B 10/40* (2013.01); *G02F 2001/212* (2013.01)

(58) Field of Classification Search
CPC . H04B 10/40; G02B 6/29343; G02B 6/29395
See application file for complete search history.

(56) References Cited

U.S. PATENT DOCUMENTS 6,631,145 B1 * 10/2003 Tamura ............... H01S 5/06256
372/18
6,633,696 B1 * 10/2003 Vahala .................. B82Y 20/00
385/1

(Continued)

OTHER PUBLICATIONS

A. Yariv, "Critical Coupling and Its Control in Optical Waveguide-Ring Resonator Systems," IEEE Photonics Technology Letters, vol. 14, No. 4, 483-485 (2002).

(Continued)

*Primary Examiner* — Dzung Tran
(74) *Attorney, Agent, or Firm* — Smith Baluch LLP

(57) ABSTRACT

A large-scale tunable-coupling ring array includes an input waveguide coupled to multiple ring resonators, each of which has a distinct resonant wavelength. The collective effect of these multiple ring resonators is to impart a distinct time delay to a distinct wavelength component (or frequency component) in an input signal, thereby carrying out quantum scrambling of the input signal. The scrambled signal is received by a receiver also using a large-scale tunable-coupling ring array. This receiver-end ring resonator array recovers the input signal by imparting a compensatory time delay to each wavelength component. Each ring resonator can be coupled to the input waveguide via a corresponding Mach Zehnder interferometer (MZI). The MZI includes a phase shifter on at least one of its arms to increase the tunability of the ring array.

23 Claims, 15 Drawing Sheets

(51) Int. Cl.
  *G02F 1/225* (2006.01)
  *G02F 1/21* (2006.01)

(56) References Cited

U.S. PATENT DOCUMENTS

| | | | | |
|---|---|---|---|---|
| 7,729,572 | B1* | 6/2010 | Pepper | G02B 6/12004 342/375 |
| 8,655,114 | B2 | 2/2014 | Popovic | |
| 2003/0128980 | A1* | 7/2003 | Abeles | H04B 10/2575 398/48 |
| 2008/0198437 | A1 | 8/2008 | Shapiro et al. | |
| 2013/0064501 | A1* | 3/2013 | Lipson | G02B 6/12007 385/30 |
| 2016/0352515 | A1* | 12/2016 | Bunandar | H04L 9/0852 |

OTHER PUBLICATIONS

B. E. Little, S. T. Chu, H. A. Haus, J. Foresi, and J.-P. Laine, "Micro-ring resonator channel dropping filters," Journal of Lightwave Technology, 15, 998-1005 (1997).
C. K. Madsen, G. Lenz, A. J. Bruce, M. A. Cappuzzo, L. T. Gomez, and R. E. Scotti, "Integrated all-pass filters for tunable dispersion and dispersion slope compensation," Photonic Technology Letters, IEEE, 11, 1623-1625 (1999).
C. Lee, Z. Zhang, G. R. Steinbrecher, H. Zhou, J. Mower, T. Zhong, L. Wang, X. Hu, R. D. Horansky, V. B. Verma, A. E. Lita, R. P. Mirin, F. Marsili, M. D. Shaw, S. W. Nam, G. W. Wornell, F. N. C. Wong, J. H. Shapiro, and D. Englund, "Entanglement-based quantum communication secured by nonlocal dispersion cancellation," Physical Review A, 90, 062331, 7 pages (2014).
C. Lupo and S. Lloyd, "Quantum data locking for high-rate private communication," New J. Phys. 17 033022, 16 pages (2015).
C. Lupo and S. Lloyd, "Quantum-Locked Key Distribution at Nearly the Classical Capacity Rate," Physical Review Letters 113, 160502-1-5 (2014).
C. Lupo, "Quantum Data Locking for Secure Communication against an Eavesdropper with Time-Limited Storage," Entropy 17, 3194-3204 (2015).
C. Lupo, M. Wilde and S. Lloyd, "Robust quantum data locking from phase modulation," arXiv:1311.5212v3, 9 pages (2014).
C. Rios, M. Stegmaier, P. Hosseini, D. Wang, T. Scherer, C. David Wright, H. Bhaskaran, W. H. P. and Pernice, "Integrated all-photonic non-volatile multi-level memory," Nature Photonics, 9, 725-732 (2015).
D. J. Lum and J. C. Howell, "Quantum enigma machine: Experimentally demonstrating quantum data locking," Physical Review A 94, 022315-1-10 (2016).
D. Sridharan, R. Bose, H. Kim,G. S. Solomon, and E. Waks, "A reversibly tunable photonic crystal nanocavity laser using photochromic thin film," Opt. Express, 19, 5551-5558 (2011).
E. Engin,D. Bonneau, C. M. Natarajan, A. S. Clark, M. G. Tanner, R. H. Hadfield, S. N. Dorenbos, V. Zwiller, K. Ohira, N. Suzuki, H. Yoshida, N. Iizuka, M. Ezaki, J. L. O'Brien, and M. G. Thompson, "Photon pair generation in a silicon micro-ring resonator with reverse bias enhancement," Opt. Express 21, 27826-27834 (2013).
E. Knill, R. Laflamme, and G. J. Milburn, "A scheme for efficient quantum computation with linear optics," Nature, 409, 46-52 (2001).
E. Timurdogan, C. M. Sorace-Agaskar, J. Sun, E. S. Hosseini, A. Biberman, and M. R. Watts, "An ultralow power athermal silicon modulator," Nature Communications 5, 11 pages (2014).
F. Xia, M. Rooks, L. Sekaric, and Y. Vlasov, "Ultra-compact high order ring resonator filters using submicron silicon photonic wires for on-chip optical interconnects," Opt. Express 15, 11934-11941 (2007).
H. Takahashi, R. Inohara, K. Nishimura, and M. Usami, "Expansion of bandwidth of tunable dispersion compensator based on ring resonators utilizing negative group delay," Journal of Lightwave Technology 24, 2276 (2006).
H. Yun, W. Shib, Y. Wanga, L. Chrostowskia, and N. A. F. Jaegera, "2×2 adiabatic 3-db coupler on silicon-on-insulator rib waveguides," in Photonics North 2013, International Society for Optics and Photonics, pp. 89150V.
International Search Report and Written Opinion dated Sep. 13, 2017 from International Application No. PCT/US2017/027197, 11 pages.
J. E. Heebner, V. Wong, A. Schweinsberg, R. W. Boyd, and D. J. Jackson, "Optical Transmission Characteristics of Fiber Ring Resonators," IEEE Journal of Quantum Electronics, vol. 40, No. 6, 727-730 (Jun. 2004).
J. Mower, Z. Zhang, P. Desjardins, C. Lee, J. H. Shapiro, and D. Englund, "High-dimensional quantum key distribution using dispersive optics," Physical Review A 87, 062322, arXiv:1210.4501v2 , 11 pages (2013).
J. Notaros, J. Mower, M. Heuck, C. Lupo, N. Harris, G. R. Steinbrecher, D. Bunandar, T. Baehr-Jones, M. Hochberg, S. Lloyd, and D. Englund, Programmable dispersion on a photonic integrated circuit for classical and quantum applications, Optical Society of America, 11 pages (2017).
J. S. Levy, A. Gondarenko, M. A. Foster, A. C. Turner-Foster, A. L. Gaeta, and M. Lipson, "CMOS-compatible multiple-wavelength oscillator for on-chip optical interconnects," Nature Photonics, 4, 37-40 (2010).
J. Takayesu, M. Hochberg, T. Baehr-Jones, E. Chan, G. Wang, P. Sullivan, Y. Liao, J. Davies, L. Dalton, A. Scherer, and W. Krug, "A hybrid electro-optic microring resonator-based 1×4×1 ROADM for wafer scale optical interconnects," Journal of Lightwave Technology, 27, 440-448 (2009).
M. Pant and D. Englund, "High-dimensional unitary transformations and boson sampling on temporal modes using dispersive optics," Physical Review A, 93, 043803, arXiv:1505.03103v1, 8 pages (2016).
N. C. Harris, Y. Ma, J. Mower, T. Baehr-Jones, D. Englund, M. Hochberg, and C. Galland, "Efficient, compact and low loss thermo-optic phase shifter in silicon," Optics Express 22, 10487-10493 (2014).
Q. Xu, B. Schmidt, S. Pradhan, and M. Lipson, "Micrometre-scale silicon electro-optic modulator," Nature 435, 325-327 (2005).
R. D. Mansoor, H. Sasse, M. A. Asadi, S. J. Ison and A. P. Duffy, "Over Coupled Ring Resonator-Based Add/Drop Filters," in IEEE Journal of Quantum Electronics, vol. 50, No. 8, 598-604 (Aug. 2014).
R. Halir, A. Maese-Novo, A. Ortega-Moñux, I. Molina-Fernández, J. G.Wangüemert-Pérez, P. Cheben,D.-X. Xu, J. H. Schmid, and S. Janz, "Colorless directional coupler with dispersion engineered sub-wavelength structure," Optics Express, 20, 13470-13477 (2012).
S. Azzini, D. Grassani, M. J. Strain, et al., "Ultra-low power generation of twin photons in a compact silicon ring resonator," Opt. Express, 20, 23100-23107 (2012).
S. Han, T. J. Seok, N. Quack, B.-W. Yoo, and M.C. Wu, "Large-scale silicon photonic switches with movable directional couplers," Optica, 2, 370-375 (2015).
S. Manipatruni, Q. Xu, B. Schmidt, J. Shakya, and M. Lipson, "High speed carrier injection 18 gb/s silicon micro-ring electro-optic modulator," Lasers and Electro-Optics Society, The Annual Meeting of IEEE, 537-538 (2007).
Seth Lloyd, "Quantum enigma machines," arXiv:1307.0380, Mon, Jul. 1, 2013, 9 pages.
T. Baehr-Jones, R. Ding, A. Ayazi, T. Pinguet, M. Streshinsky, N. Harris, J. Li, L. He, M. Gould, Y. Zhang, A. Eu-Jin Lim, T.-Y. Liow, S. Hwee-Gee Teo, G.-Lo, and M. Hochberg, 3t al., "A 25 gb/s silicon photonics platform," arXiv preprint arXiv:1203.0767, 11 pages (2012).
V. R. Almeida, C. A. Barrios, R. R. Panepucci, and M. Lipson, "All optical control of light on a silicon chip," Nature, 431, 1081-1084 (2004).
Y. Lahini, A. Avidan, F. Pozzi, M. Sorel, R. Morandotti, D. N. Christodoulides, and Y. Silberberg, "Anderson localization and nonlinearity in one-dimensional disordered photonic lattices," Phys. Rev. Lett., 100, 013906, arXiv:1505.03103v1, 4 pages (2008).

(56) References Cited

OTHER PUBLICATIONS

Y. Okawachi, K. Saha, J. S. Levy, H. Wen, M. Lipson, and A. L. Gaeta, "Octave-spanning frequency comb generation in a silicon nitride chip," Opt. Lett., 36, 3398-3400 (2011).

Z. Ji, D. Jia, P. Nie, H. Zhang, D. Zhang, and Y. Zhang, "Two-dimensional coherent optical en/decoder using parallel-cascaded coupled third-order microring resonator," Optics Communications, 347, 123-129 (2015).

* cited by examiner

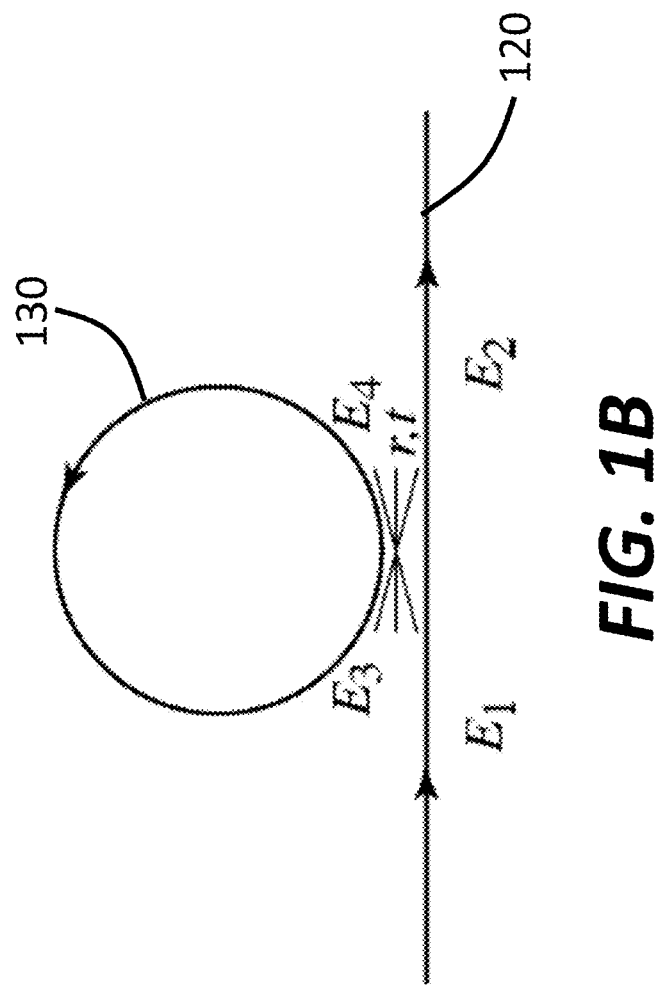

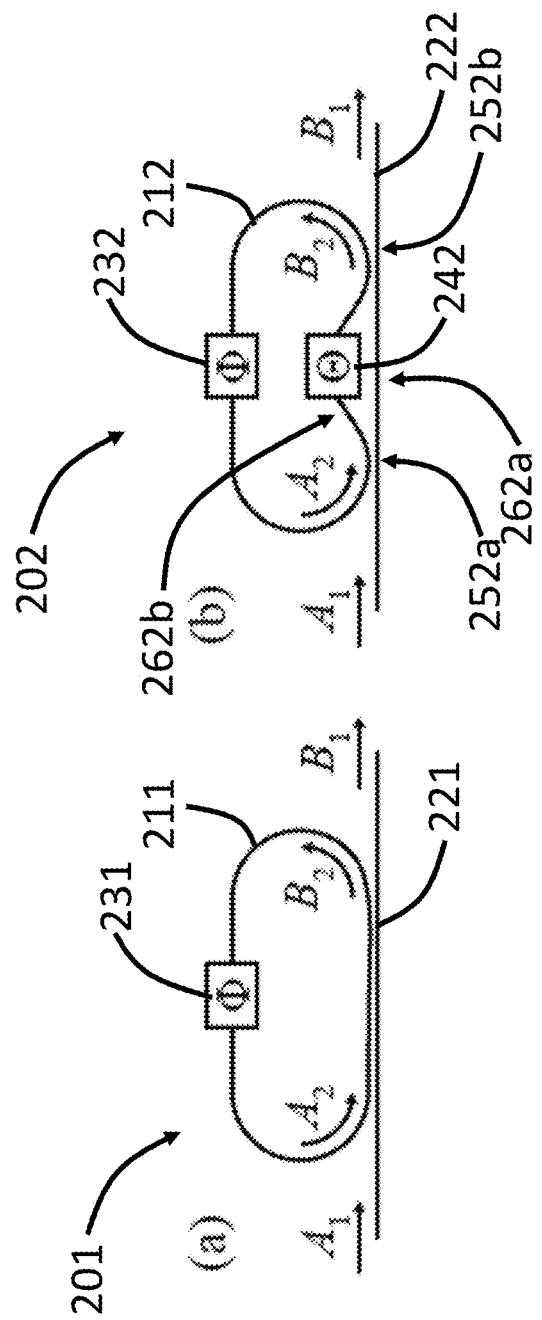

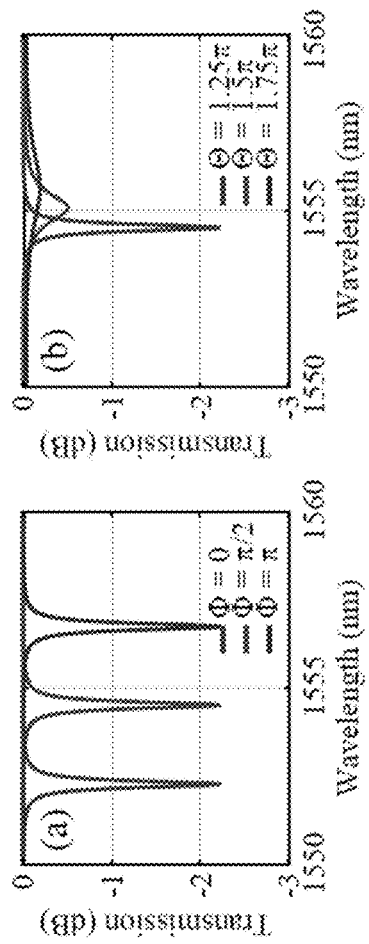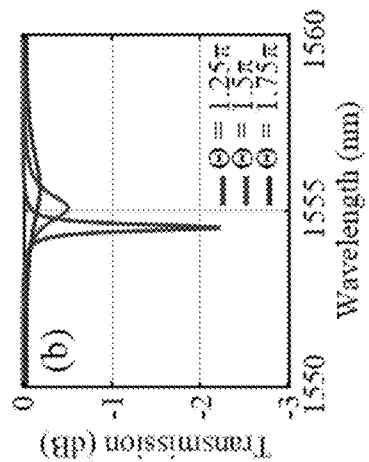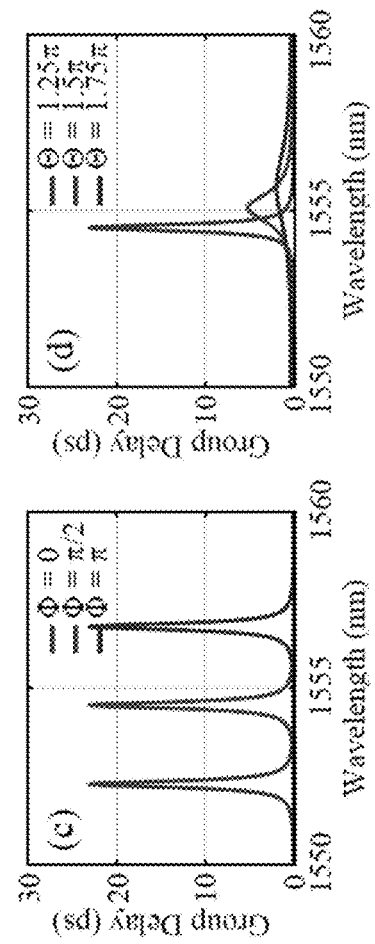

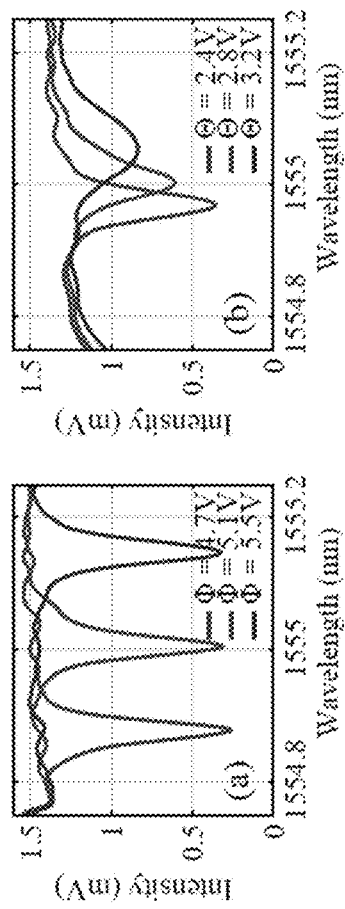
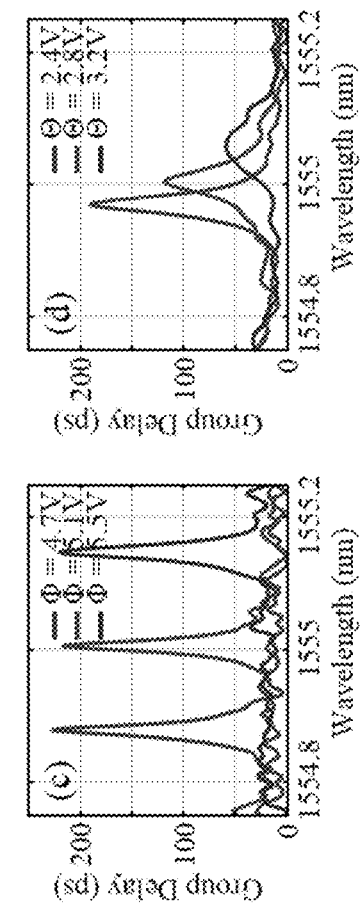
FIG. 10A
FIG. 10B
FIG. 10C
FIG. 10D

APPARATUS AND METHODS FOR LOCKED QUANTUM COMMUNICATION USING PHOTONIC INTEGRATED CIRCUITS

CROSS-REFERENCES TO RELATED APPLICATIONS

This application claims priority to U.S. Application No. 62/321,261, filed Apr. 12, 2016, entitled "PHOTONIC INTEGRATED CIRCUITS FOR LOCKED QUANTUM COMMUNICATION," which is hereby incorporated herein by reference in its entirety.

GOVERNMENT SUPPORT

This invention was made with Government support under Grant No. FA9550-14-1-0052 awarded by the Air Force Office of Scientific Research and under Grant No. W31P4Q-12-1-0019 awarded by the Army Contracting Command. The Government has certain rights in the invention.

BACKGROUND

Control of dispersion is desirable in many optical applications, such as compensation for fiber-induced dispersion in communications systems, tunable group-velocity dispersion for mode locking of laser sources, and quantum scrambling for quantum enigma machines. Conventional techniques for controlling dispersion include chirped fiber gratings, coupled resonator optical waveguides (CROWs), and side-coupled integrated spaced sequences of resonators (SCISSORs). However, as interest turns towards dispersion-based quantum applications, dispersion control with a large number of tunable parameters becomes desirable to enable a large set of basis states. For these applications, conventional solutions usually are not able to provide the desired tunability, speeds, and scalability for practical demonstrations.

For example, a quantum enigma machine can be constructed based on quantum data locking. Suppose that a sender (usually referred to as Alice) possesses an n-bit message j that she wishes to send to a receiver (usually referred to as Bob). Alice and Bob initially possess a secret, fully random m-bit string k (also referred to as the seed), where m<<n. They publicly agree upon a set of $2^m$ unitary operations $U_k$, randomly selected according to the Haar measure. Alice first maps the message j to a quantum state $|j\rangle$. She then applies the transformation $U_k$ corresponding to the shared seed k and sends the resulting state $|j\rangle_k = U_k|j\rangle$ to Bob. Bob decodes the message by applying the inverse transformation $U_k^{-1}|j\rangle_k = |j\rangle$. The devices that perform Alice's and Bob's encoding and decoding operations can be termed quantum enigma machines, in analogy to classical enigma machines that encode and decode via classical invertible transformations.

Although quantum data locking may be realized in theory using bulk optical components, scaling to larger mode numbers (larger dimensionality) involves a degree of phase stability and device complexity that is difficult to realize using bulk optics. In addition, it is also desirable in quantum data locking to realize various operations $U_k$ using the same hardware device (e.g., transmitter and/or receiver) so as to scramble the input in various ways. This broad tunability is also a challenge for bulk optics.

SUMMARY

Embodiments of the present invention include apparatus, systems, and methods of quantum data locking using photonic integrated circuits. In one example, an apparatus for quantum communication includes a light source to provide an input signal having a plurality of distinct spectral components. Each photon in the input signal represents at least one photonic qubit encoded in a time domain basis. The apparatus also includes an input waveguide, optically coupled to the light source, to guide the input signal. A plurality of ring resonators is optically coupled to the input waveguide to receive the input signal via the input waveguide. Each ring resonator in the plurality of ring resonators has a resonant wavelength matching a wavelength of a corresponding distinct spectral component in the plurality of distinct spectral components, such that the plurality of ring resonators delays each distinct spectral component in the plurality of distinct spectral components by a distinct time delay.

In another example, a system for quantum communication includes a transmitter and a receiver. The transmitter includes an input waveguide to guide an input signal having a plurality of spectral components. An ith spectral component in the plurality of spectral components has an input wavelength $\lambda_i$, where i=1, 2, ..., N and N is a positive integer. The transmitter also includes a first plurality of ring resonators, optically coupled to the input waveguide, to generate a scrambled optical signal from the input signal. An ith ring resonator in the first plurality of ring resonators has a resonant wavelength $\lambda_i$ such that the first plurality of ring resonators imparts a time delay $\tau_i$ to the ith spectral component in the input signal so as to generate the scrambled optical signal. The receiver is in optical communication with the transmitter to receive the scrambled optical signal. The receiver includes a second plurality of ring resonators to impart a time delay $-\tau_i$ to the ith spectral component in the scrambled optical signal so as to recover the input signal.

In yet another example, a method of quantum enigma includes transmitting an input signal through a first plurality of ring resonators to generate a scrambled optical signal. The input signal has a plurality of spectral components, an ith spectral component having an input wavelength $\lambda_i$, where i=1, 2, ..., N and N is a positive integer. An ith ring resonator in the first plurality of ring resonators has a resonant wavelength at $\lambda_i$ such that the first plurality of ring resonators imparts a time delay $\tau_i$ to the ith spectral component in the input light.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1B illustrates overcoupling of a ring resonator to an input waveguide that can be used in the apparatus shown in FIG. 1A.

FIG. 2A shows a schematic of a system including a ring resonator with tunable resonance.

FIG. 2B shows a schematic of a system including a ring resonator with tunable resonance and tunable coupling.

FIGS. 3A and 3B show calculated transmission of a ring resonator as a function of wavelength for various resonance phase settings and various coupling settings, respectively.

FIGS. 3C and 3D show calculated group delays of a ring resonator as a function of wavelength for various resonance phase settings and various coupling phase settings, respectively.

FIGS. 10A and 10B show measured transmission of an array of one tunable ring resonator as a function of wavelength for various resonance phase settings and various coupling phase settings, respectively.

FIGS. 10C and 10D show measured group delay of one tunable ring resonator as a function of wavelength for various resonance phase settings and various coupling phase settings, respectively.

DETAILED DESCRIPTION

Overview

Integrated silicon photonics, capable of controlling many modes in a phase stable way, can be used to achieve large-scale dispersion control with broad tunability using an on-chip tunable-coupling ring resonator array. In this approach, ring resonators are coupled to a waveguide via Mach-Zehnder interferometers (MZIs). Each ring resonator has a phase shifter disposed on or in the ring to control the resonant wavelength of the ring resonator. The MZI that couples the ring resonator also has a phase shifter disposed on one of its arms to control the amount of time delay applied to photons transmitted through the ring resonator. In this manner, each ring resonator has two degrees of freedom (one in the ring and the other in the MZI) for tunability. Serially cascading multiple tunable-coupling ring resonators (e.g., more than 10) can construct a system having 30 individually-controllable degrees of freedom with resolution of each degree of freedom greater than 10 bits.

This large-scale tunable-coupling ring array has many benefits in both classical and quantum applications. The array allows for reconfigurable dispersion control in a range of classical applications, including mode-locked lasers for frequency comb generation and higher-order optical dispersion cancellation for communications and sensing. In the area of quantum information processing, benefits of the system include tunable dispersion for temporal-mode high-dimensional quantum key distribution, pulse-shaping of photon pairs generated by spontaneous four-wave mixing, and quantum enigma machines.

In quantum enigma machines, the large-scale tunable-coupling ring array can include multiple ring resonators, each of which has a distinct resonant wavelength. The collective effect of these multiple ring resonators is to impart a distinct time delay to a distinct wavelength component (or frequency component) in the input signal, thereby carrying out quantum scrambling of the input signal. The scrambled signal is received by a receiver also using a large-scale tunable-coupling ring array. This receiver-end ring resonator array can recover the input signal by imparting a compensatory time delay to each wavelength component. For example, the sender can delay a spectral component $\lambda_i$ by $\tau_i$ and the receiver then delays $\tau_i$ to the same spectral component $\lambda_i$ to recover the input signal.

Apparatus for Quantum Scrambling Using Ring Resonators

Figure 1A:
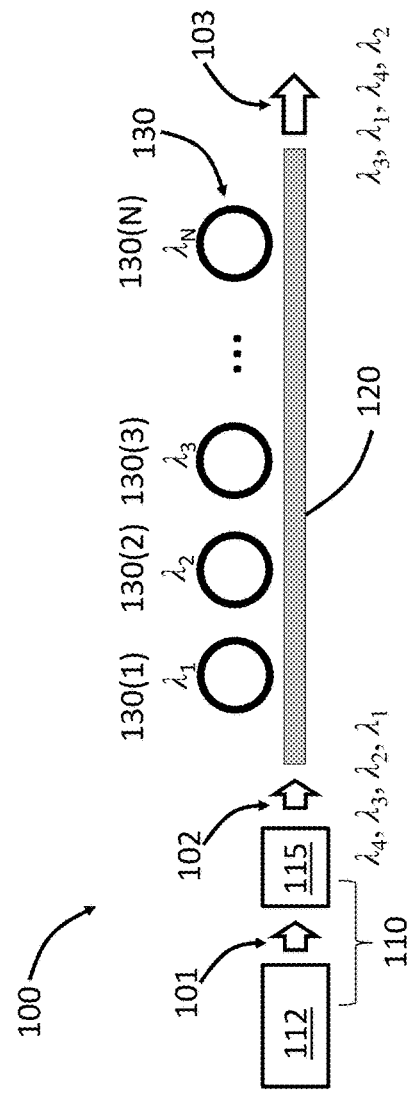
FIG. 1A shows a schematic of an apparatus for quantum communication using ring resonators to scramble input signals.

FIG. 1A shows a schematic of an apparatus 100 that generates and transmits scrambled optical signals for quantum communication using an array of ring resonators. The apparatus 100 includes a light source 110 to provide an input signal 102, which is guided to an input waveguide 120 optically coupled to an array of ring resonators 130(1), 130(2), . . . , and 130(N) (collectively referred to as ring resonators 130), where N is a positive integer. The input signal 102 includes multiple spectral components, each of which has a distinct wavelength $\lambda_i$, where i=1, 2, . . . , N. For each spectral component (e.g., at wavelength $\lambda_i$), the ring resonators 130 also includes at least one ring resonator having a resonant wavelength substantially equal to the wavelength $\lambda_i$. Each ring resonator 130 imparts a distinct time delay $\tau_i$ to the ith spectral component in the input signal 102, thereby effectively scrambling the input signal 102 and generating a scrambled optical signal 103 for quantum communication.

For example, the input light 102 can include four spectral components at $\lambda_1$, $\lambda_2$, $\lambda_3$, and $\lambda_4$ arranged in chronological sequence, i.e. $\lambda_1$ at the beginning of the input signal 102 and $\lambda_4$ at the tail of the input signal 102. After transmission through the ring resonators 130, the input signal 102 is converted into a scrambled signal 103. The scrambled signal 103 also includes the four spectral components at $\lambda_1$, $\lambda_2$, $\lambda_3$, and $\lambda_4$, but now their order is rearranged. For example, $\lambda_2$ can be at the beginning of the scrambled optical signal 103 and $\lambda_3$ can be at the tail of the scrambled optical signal 103.

In some cases, different spectral components at different wavelengths may have similar time delays. In general, the ring resonators 130 introduce a wavelength dependent time delay, i.e., $\tau(\lambda)$, which is controllable by setting the parameters of the ring resonators (see, e.g., 4 below). In some applications, it can be helpful to have controllable $\tau(\lambda)$ such that each photon or each light pulse can undergo a different transformation U through the ring resonators 130 (see, e.g., FIG. 12 and descriptions below).

FIG. 1B is a schematic illustrating the overcoupling of the ring resonator 130 with the input waveguide 120. The ring resonators 130 can be overcoupled to the input waveguide 120 to increase the magnitude of the scrambled signal 103. Without being bound by any particular theory or mode of operation, the coupling of light into and out of the resonator 130 can be described in terms of generalized beam splitter relations of the form:

$$E_2 = rE_1 + itE_3 \quad (1)$$

$$E_4 = rE_3 + itE_1 \quad (2)$$

where $E_1$, $E_2$, $E_3$, and $E_4$ are the electrical field at the indicated locations shown in FIG. 1B, r and t and are taken to be real quantities that satisfy the relation $r^2 + t^2 = 1$. The fields can be defined with respect to the reference points indicated in FIG. 1B.

In addition, the circulation of light within the resonator can be described in terms of the round-trip phase shift $\phi$ and the amplitude transmission factor $\tau$ such that:

$$E_2 = \tau \exp(i\phi) E_4 \quad (3)$$

where the round-trip phase shift $\phi$ is $\phi = kL$, $k = 2\pi n/\lambda$, n is the effective refractive index of the ring resonator 130 at $\lambda$, $\lambda$ is the vacuum wavelength of the light at $\lambda$, and L is the optical path length of the ring resonator 130.

Equations (1)-(3) can be solved simultaneously to find that the input and output fields are related by the complex amplitude transmission:

$$\frac{E_2}{E_1} = \exp[i(\pi + \phi)] \frac{\tau - r\exp(-i\phi)}{1 - r\tau\exp(i\phi)} \quad (4)$$

The intensity transmission factor T is given by the squared modulus of this quantity:

$$T = \left|\frac{E_2}{E_1}\right|^2 = \frac{\tau^2 - 2r\tau\cos\phi + r^2}{1 - 2r\tau\cos\phi + r^2\tau^2} \quad (5)$$

On resonance, i.e., $\phi=0$, the transmission drops to zero for the situation $r=\tau$. In this case, the internal losses are equal to the coupling losses, and the resonator 130 is usually referred to as being critically coupled. For $r>\tau$, the resonator 130 is usually referred to as being undercoupled, and for $r<\tau$ the resonator 130 is usually referred to as being overcoupled. In overcoupling, the internal losses (also referred to as parasitic losses) are less than coupling losses.

For quantum communication, each photon in the input signal 102 represents a photonic qubit encoded in a time domain basis. To prepare these quantum states, the light source 110 further includes a pulsed laser 112 to provide a light pulse 101 and an encoder 115 to encode each photon in the light pulse 101 in a time domain basis. In one example, the pulsed laser 112 can include a single-photon source to provide the light pulse 101 including a single photon. In another example, the pulsed laser 112 can emit a the light pulse 101 with multiple photons.

The encoder 115 is employed in the apparatus 100 to prepare quantum states for communication. Generally, the encoder 115 encodes each photon with a binary bit (0 or 1) to form the input signal 101. In one example, the encoder 115 includes a Mach-Zehnder Interferometer having a first arm and a second arm. The first arm has a first optical path length and the second arm has a second optical path length different from the first optical path length. For example, the second optical path length can be greater than the first optical path length. In this case, a photon is encoded into an "early" time bin by transmission through the first arm and is encoded into a "late" time bin by transmission through the second arm. In this manner, a binary bit (0 or 1, corresponding to early or late time bin) can be encoded into the photon.

In another example, the encoder 115 includes a ring resonator and a modulator coupled to the ring resonator to adjust the optical path length of the ring resonator. A photon can be encoded into an "early" time bin by transmitting through the ring resonator without any modulation from the modulator. The photon can be encoded into a "late" time bin by increasing the optical path length of the ring resonator using the modulator. More information about encoding a photon in the time domain basis can be found in PCT Application No. PCT/US2016/034639, entitled "APPARATUS AND METHODS FOR QUANTUM KEY DISTRIBUTION," which is hereby incorporated herein by reference in its entirety.

In yet another example, the encoder 115 can be part of the array of ring resonators 130. In other words, the ring resonators 130 can perform both encoding and scrambling of the light pulse 101 to generate the scrambled optical signal 103.

In some cases, the encoder 115 can encode more than one bit of information into a single photon. For example, the encoder 115 can put a photon into one of multiple time bins by transmitting the photon through multiple optical path lengths. The number of time bins can be greater than three (e.g., greater than 3, greater than 5, greater than 10, greater than 20, greater than 30, greater than 40 or more, including any values and sub ranges in between). If d time bins are used, the number of bits encoded into each photon is $\log_2(d)$. Therefore, transmitting n bit of information can be realized by using $n/\log_2(d)$ photons.

The number of resonators 130 can affect the number of different delay settings that can be applied on the input signal 102. A delay setting usually refers to a functional relationship between the time delay $\tau$ as a function of the wavelength $\lambda$, i.e., $\tau(\lambda)$. A larger number of delay settings leads to a greater tunability. In practice, the apparatus 100 can include 10 or more ring resonators (e.g., 10 ring resonators, 15 ring resonators, 20 ring resonators, 30 ring resonators, 50 ring resonators, 100 ring resonators, or more, including any values and sub ranges in between).

The spacing between different resonant wavelengths (also referred to as the step size of the resonant wavelengths) of the resonators 130 can be about 0.01 nm to about 1 nm (e.g., about 0.01 nm, about 0.02 nm, about 0.03 nm, about 0.05 nm, about 0.1 nm, about 0.2 nm, about 0.3 nm, about 0.5 nm, or about 1 nm). The range of the resonant wavelengths (i.e. the largest difference among two resonant wavelengths) can be about 0.1 nm to about 10 nm (e.g., about 0.1 nm, about 0.2 nm, about 0.5 nm, about 1 nm, about 2 nm, about 3 nm, about 4 nm, about 5 nm, about 6 nm, about 7 nm, about 8 nm, about 9 nm, or about 10 nm, including any values and sub ranges in between).

Various materials can be used to fabricate the ring resonators 130. For example, the ring resonators 130 can include silicon, germanium, silicon oxide (e.g., $SiO_2$), silicon nitride (e.g., $Si_3N_4$), or any other materials known in the art. In one example, the input waveguide 120 and the ring resonators 130 can include the same material. In another example, the input waveguide 120 and the ring resonators 130 can include different materials.

The diameter of the ring resonators 130 can be about 15 µm to about 200 µm (e.g., about 15 µm, about 20 µm, about 30 µm, about 50 µm, about 75 µm, about 100 µm, about 125 µm, about 150 µm, about 175 µm, or about 200 µm, including any values and sub ranges in between).

The ring resonators 130 shown in FIG. 1A have a round shape. Alternatively, the ring resonators 130 can have other shapes, such as the configuration shown in FIG. 6. In these cases, it can be more convenient to characterize the ring resonators 130 by their optical path length (in the condition without any modulation). In some cases, the optical path length of the ring resonators can be about 100 µm to about 1 mm (e.g., about 100 µm, about 200 µm, about 300 µm, about 400 µm, about 500 µm, about 600 µm, about 700 µm, about 800 µm, about 900 µm, or about 1 mm, including any values and sub ranges in between).

In one example, the ring resonators 130 have the same diameter and/or optical path length and a modulator (e.g., a phase shifter) can be used to achieve different resonant wavelengths for different ring resonators. In another example, the ring resonators 130 can have different diameters and/or optical path lengths to achieve different resonant wavelengths.

The time delay imparted by the ring resonators 130 on different spectral components in the input signal 102 can be about 20 ps to about 500 ps (e.g., about 20 ps, about 30 ps, about 50 ps, about 100 ps, about 150 ps, about 200 ps, about 300 ps, about 400 ps, or about 500 ps, including any values and sub ranges in between).

The quality factor (Q) of the ring resonators 130 can be substantially equal to or greater than $10^5$ (e.g., about $10^5$, about $5 \times 10^5$, about $10^6$, about $5 \times 10^6$, about $10^7$, or more, including any values and sub ranges in between).

Ring Resonators Coupled Via Mach-Zehnder Interferometers (MZIs)

The tunability of ring resonators can be improved using phase shifters. For example, a phase shifter can be coupled to the ring resonator to change the ring resonator's resonant wavelength by changing the optical path length. In addition, a phase shifter can also be included into a Mach-Zehnder interferometer (MZI) that couples the ring resonator to a waveguide. This phase shifter can adjust the amount of delay imposed by the ring resonator on an input signal.

FIG. 2A shows a schematic of a system 201 including a ring resonator 211 with tunable resonance. The ring resonator 211 (e.g., evanescently) is optically coupled to a waveguide 221. A phase shifter 231 is disposed in the optical path of the ring resonator 211 to change the resonant wavelength of the ring resonator 211 by introducing a phase shift Φ into the ring resonator 211. The phase shifter 231 can include, for example, a thermal-optic modulator. The system 201 can produce a frequency dependent phase shift on the transmitted mode of the waveguide 221 across the frequency linewidth (also referred to as pass band) of the ring resonator 211. In the system 201, the linewidth of the resonance of the ring resonator 211 is usually fixed.

FIG. 2B shows a schematic of a system 202 including a ring resonator 212 with both tunable resonance and tunable coupling. The ring resonator 212 is coupled (e.g., evanescently) to a waveguide 222 via two points 252a and 252b, which define an MZI having a first arm 262a and a second arm 262b. The system 202 also includes two phase shifters: a first phase shifter 232 disposed in the optical path of the ring resonator 211 and a second phase shifter 242 disposed in one arm (e.g., arm 262b) of the MZI. The first phase shifter 242 applies a phase shift Φ to change the resonant wavelength of the ring resonator 212, and the second phase shifter applies a phase shift Θ to control the coupling ratio between the ring resonator 212 and the waveguide 222. The second phase shifter 242 can also change the amount of delay imposed on the light coupled into the waveguide 222 and transmitted through the ring resonator 212 (see, e.g., FIG. 3D).

The transmission through the ring resonators 211 and 212 shown in FIGS. 2A and 2B, respectively, can be calculated using coupled mode analysis. In this analysis, waveguide modes A1 and B1 and ring modes A2 and B2 are labelled in FIGS. 2A and 2B. Without being bound by any particular theory or mode of operation, the coupled equation can be written as:

$$\begin{pmatrix} B_1 \\ B_2 \end{pmatrix} = M \begin{pmatrix} A_1 \\ A_2 \end{pmatrix} \qquad (6)$$

where the transfer matrix, M, depends on the coupling between the ring resonator (211 or 212) and the corresponding bus waveguide (221 or 222).

For the system 201, the ring resonator 211 can be coupled to the waveguide 221 via a directional coupler, in which case the matrix takes the form:

$$M_{coupler} = \frac{1}{\sqrt{2}} \begin{bmatrix} \kappa & i\sqrt{1-\kappa^2} \\ i\sqrt{1-\kappa^2} & \kappa \end{bmatrix} \qquad (7)$$

where the coupling coefficient, κ, is largely set during fabrication.

For the system 202 where an MZI is used for coupling the ring resonator 212 to the waveguide 222, the transfer matrix takes the form:

$$M_{MZI} = e^{i(\Theta/2 + \pi/2)} \begin{bmatrix} \sin(\Theta/2) & \cos(\Theta/2) \\ \cos(\Theta/2) & -\sin(\Theta/2) \end{bmatrix} \qquad (8)$$

where Θ is the phase shift induced by the MZI.

In addition to the coupled equation, the feedback condition for the ring is given as:

$$A_2 = \alpha e^{i(\beta(\omega)L + \Phi)} B_2 \qquad (9)$$

where $\alpha$ is the intrinsic cavity loss rate, $\beta(\omega) = n_{eff}\omega/c_0$ is the frequency-dependent propagation constant, $\omega$ is the angular frequency, $c_0$ is the speed of light in vacuum, $n_{eff}$ is the effective refractive index, L is the ring length, and $\Phi$ is the phase shift induced by the resonance phase setting. Using this feedback equation and the transfer matrix in Equation (8), the transmission through the tunable-coupling ring is derived to be:

$$T(\omega) = \frac{B_1}{A_1} = \frac{1 - e^{i\Theta} + 2e^{i(\beta(\omega)L + \Phi + \Theta)}\alpha}{2 - e^{i(\beta(\omega)L + \Phi)}\alpha + e^{i(\beta(\omega)L + \Phi + \Theta)}\alpha} \qquad (10)$$

FIGS. 3A and 3B show calculated transmission of a ring resonator as a function of wavelength for various resonance phase settings and various coupling phase settings, respectively. FIGS. 3C and 3D show calculated group delays of a ring resonator as a function of wavelength for various resonance phase settings and various coupling phase settings, respectively. The calculations are performed using Equation (10), with $\alpha=0.99$, L=100 μm, and $n_{eff}=2.7$. The group delay $\tau(\omega)$ is calculated by $\tau(\omega)=-d\angle T(\omega)/d\omega$, where $\angle T(\omega)$ is the transmission phase angle.

Group delay is chosen as a performance metric since it is the quantity of interest in many applications including dispersive-optics quantum key distribution and quantum data locking and is directly related to phase by the derivate with respect to frequency. As shown in FIGS. 3A-3D, varying $\Phi$ from about 0 to about $\pi$ can shift the resonant wavelength from about 1553 nm to about 1557 nm. Varying $\Theta$ from about 1.25$\pi$ to about 1.75$\pi$ can change the group delay from about 23 ps to about 5 ps. Varying $\Theta$ can also induce a slight resonance shift, as seen FIGS. 3B and 3D.

Figure 4:
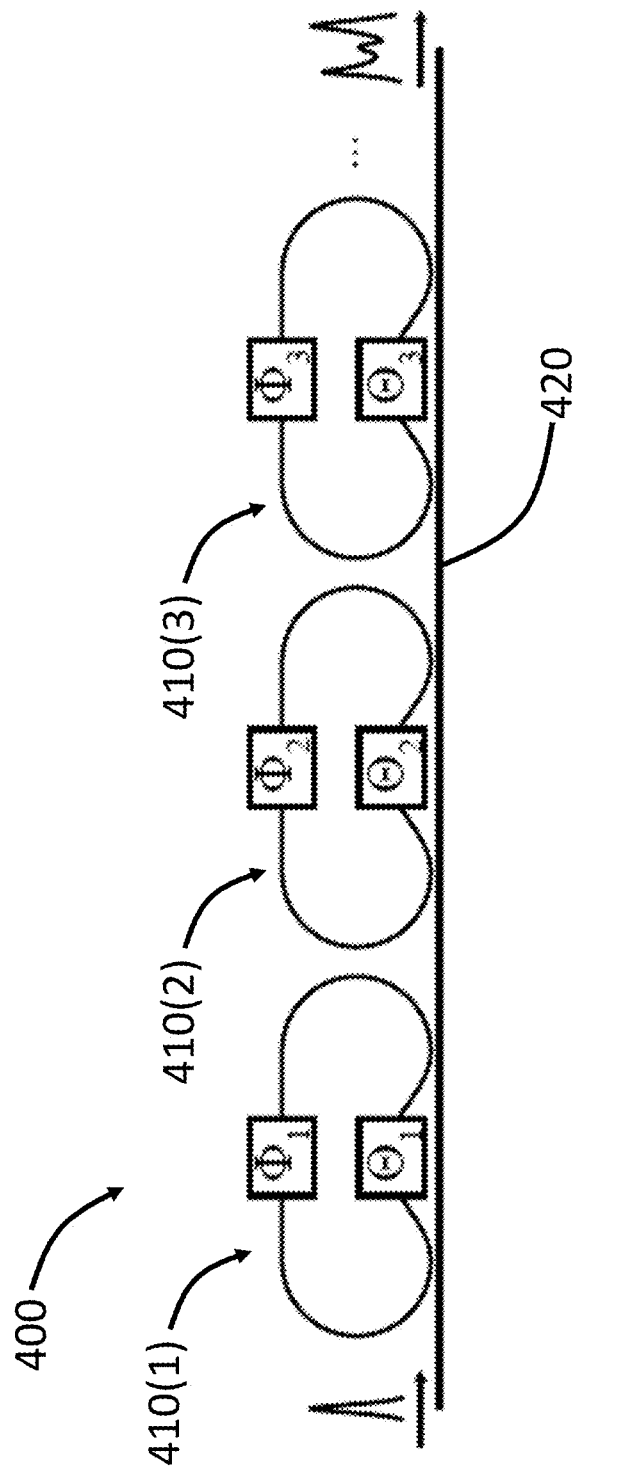
FIG. 4 shows a schematic of an array of ring resonators with tunable resonance and tunable coupling.

FIG. 4 shows a schematic of a tunable-coupling ring array (TCRA) 400 illustrating a series of three ring resonators 410(1), 410(2), and 410(3) (collectively referred to as ring resonators 410) that are coupled (e.g., evanescently) to a waveguide 420. Each ring resonator 410 is substantially identical to the ring resonator 212 shown in FIG. 2B. The array 400 can include more than three ring resonators to increase the tunability. The number of ring resonators can be substantially equal to or greater than 10.

In the array 400, the ring resonators' resonant frequencies are set using phases $\Phi_j$ and the couplings are set using phases $\Theta_j$. Without being bound by any particular theory or mode of operation, the transfer function (also referred to as dispersion function or delay function) of the array 400 with a total number of N rings can be written as the product of the functions of the individual rings:

$$T_N(\omega) = \prod_{j=1}^{n} T_j(\omega) = \prod_{j=1}^{n} \frac{1 - e^{i\Theta j} + 2e^{i(\beta(\omega)L + \Phi j + \Theta j)}\alpha_j}{2 - e^{i(\beta(\omega)L + \Phi j)}\alpha_j + e^{i(\beta(\omega)L + \Phi j + \Theta j)}\alpha_j} \qquad (11)$$

where j is the index of each tunable-coupling ring in the array and $\alpha_j$, $\Theta_j$, and $\Phi_j$ are the intrinsic cavity loss rates, coupling MZI phase shifts, and resonance phase shifts, respectively, of each ring resonator 410.

In Equation (11), each $\Theta_j$ and $\Phi_j$ is a degree of freedom that can be used to achieve a target frequency-dependent dispersion function $T_{target}(\omega)$. In other words, given a target dispersion function $T_{target}(\omega)$, the parameters $\Theta_j$ and $\Phi_j$ can be tuned to approximate $T_{target}(\omega)$. For example, a desired $T_{target}(\omega)$ can be achieved by setting the $\Theta_j$ and $\Phi_j$ phase shifts (a total of 2N parameters) using a (MATLAB) interior-point nonlinear optimization procedure for minimizing the mean squared error.

Figure 5:
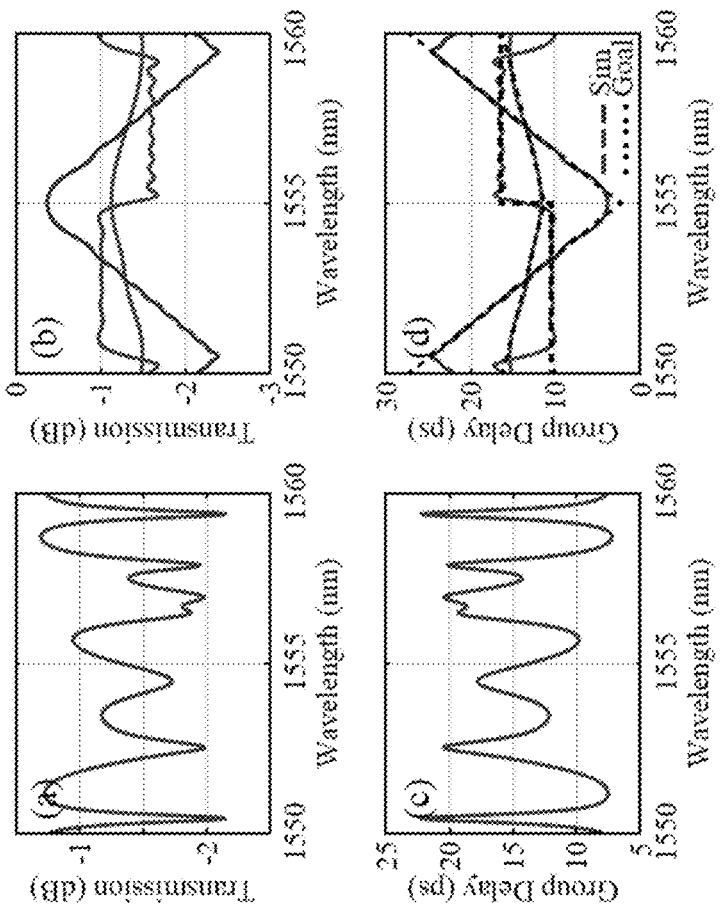
FIG. 5A shows calculated transmission of an array of 15 ring resonators as a function of wavelength with phase settings set at random values between 0 and $2\pi$.
FIG. 5B shows calculated transmission of an array of 15 ring resonators as a function of wavelength with optimized phase settings to achieve three goal groups of dispersion functions.
FIG. 5C shows calculated group delay of an array of 15 ring resonators as a function of wavelength with phase settings set at random values between 0 and $2\pi$.
FIG. 5D shows calculated group delay of an array of 15 ring resonators as a function of wavelength with optimized phase settings to achieve three goal groups of dispersion functions.

FIG. 5A shows calculated transmission of an array of 15 ring resonators as a function of wavelength with phase settings set at random values between 0 and 2$\pi$. FIG. 5B shows calculated transmission of the same array of 15 ring resonators as a function of wavelength with optimized phase settings to achieve three goal groups of dispersion functions. FIG. 5C shows calculated group delay of an array of 15 ring resonators as a function of wavelength with phase settings set at random values between 0 and 2$\pi$. FIG. 5D shows calculated group delay of an array of 15 ring resonators as a function of wavelength with optimized phase settings to achieve three goal groups of dispersion functions. In these simulations, $\alpha=0.99$, L=100 μm, and $n_{eff}=2.7$. The goal group delays are shown as dashed lines while the optimized simulations are shown as solid lines.

As shown in FIGS. 5A-5D, the single TCRA simulated device is able to closely match various desired group delays and can create a large set of phase transformations suitable for high-dimensional quantum applications. The desired transmission functions and group delays shown in FIGS. 5B and 5D, respectively, were arbitrary. But in each case, the phase settings of the TCRA can be used to achieve the desired transmission function and group delay with high precision. In other words, the TCRA can be used to apply an arbitrary transformation to input signals for quantum communications. The bandwidth of the TCRA can be limited by the free spectral range of the largest ring in the array and the bandwidth-utilization ratio. Additionally, when the number of rings in the system is increased, the number of discernible phase settings and corresponding transformations grows.

Characterizations of Tunable-Coupling Resonator Arrays

Experimentally implementing a large-scale tunable-dispersion system, such as a TCRA, can be extremely challenging for bulk-optics as it includes many phase-stable interferometers. In contrast, photonic integrated circuits can be used to fabricate the TCRA using a modern silicon photonics foundry coupled with driving electronics.

Figure 6:
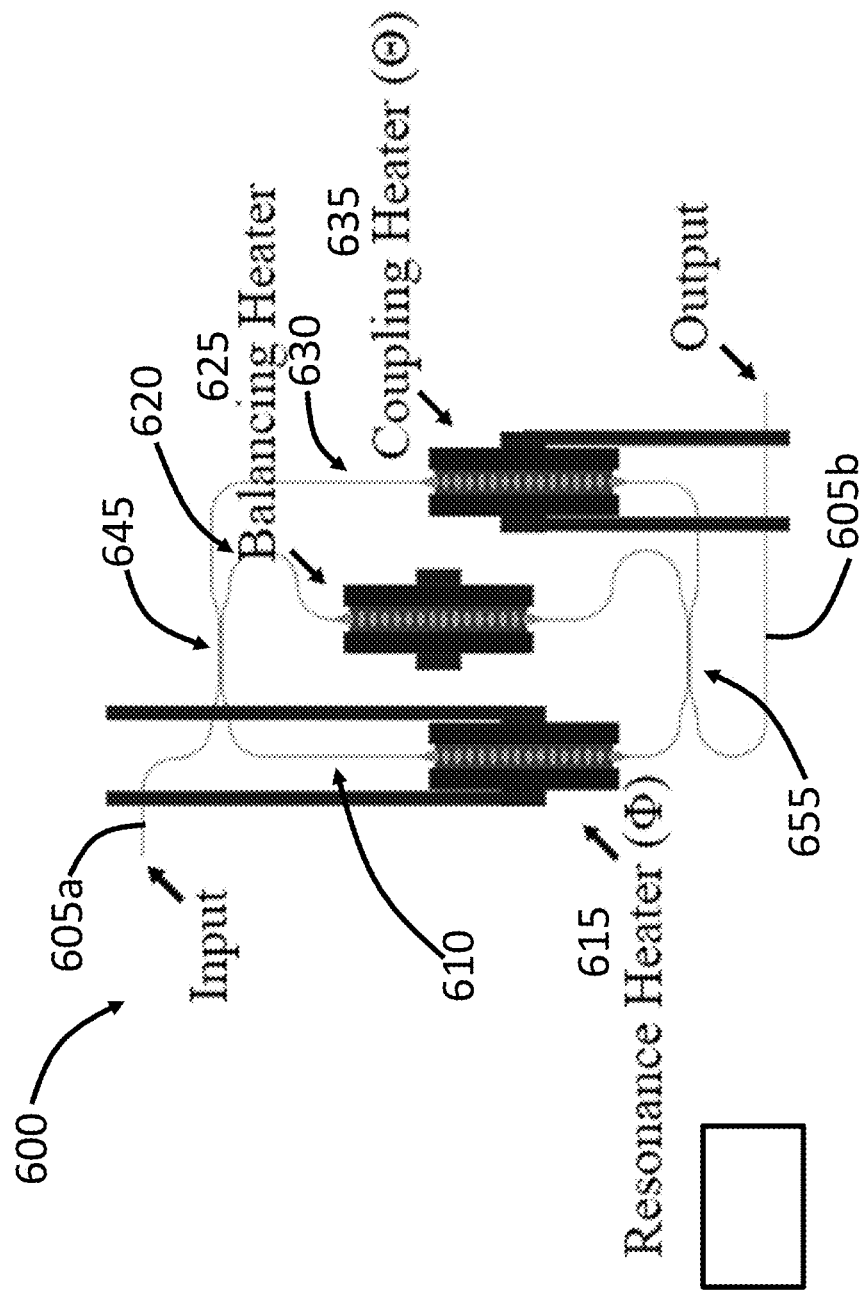
FIG. 6 shows a schematic of a tunable ring resonator with three thermo-optic modulator heaters to increase resonance and coupling tunability.

FIG. 6 shows a schematic of a tunable ring resonator 600 with three thermo-optic modulator heaters to increase resonance and coupling tunability. The resonator 600 includes an input waveguide 605a to receive input signals and an output waveguide 605b to output signals transmitted through the ring resonator 600. An input coupler 645 directs the input signals into three possible beams paths 610, 620, and 630. The first beam path 610 and the second beam path 620 form a ring resonator. The second beam path 620 and the third beam path 630 form an MZI, where the second beam path 620 and the third beam path 630 are the two arms of the MZI. In other words, one arm of the MZI is part of the ring resonator. An output coupler 655 is coupled to the three beam paths 610 to 630 to collect signals and deliver the collected signals to the output waveguide 605b.

Each beam path in the three beam paths 610 to 630 includes a phase shifter (have a heater). The first beam path 610 includes a first phase shifter 615 (also referred to as a resonance heater 615) to change the resonant wavelength of the ring resonator. The third beam path 630 includes a third phase shifter 635 (also referred to as a coupling heater 635) to change the coupling phase $\Theta$ and the delay imposed on the input signals. The second beam path 620 includes a second phase shifter 625 (also referred to as a balancing heater 625) to compensate for possible optical losses induced by the coupling heater 635.

Figure 7A:
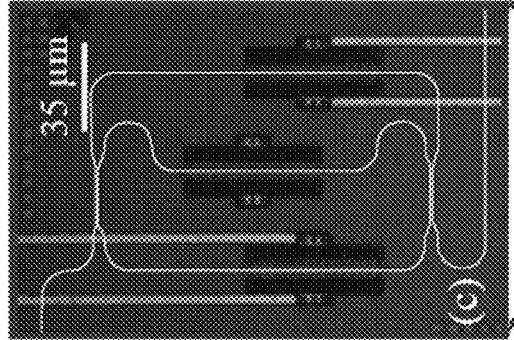
FIG. 7A shows an optical micrograph of a fabricated tunable ring resonator like the one shown in FIG. 6.
Figure 7B:
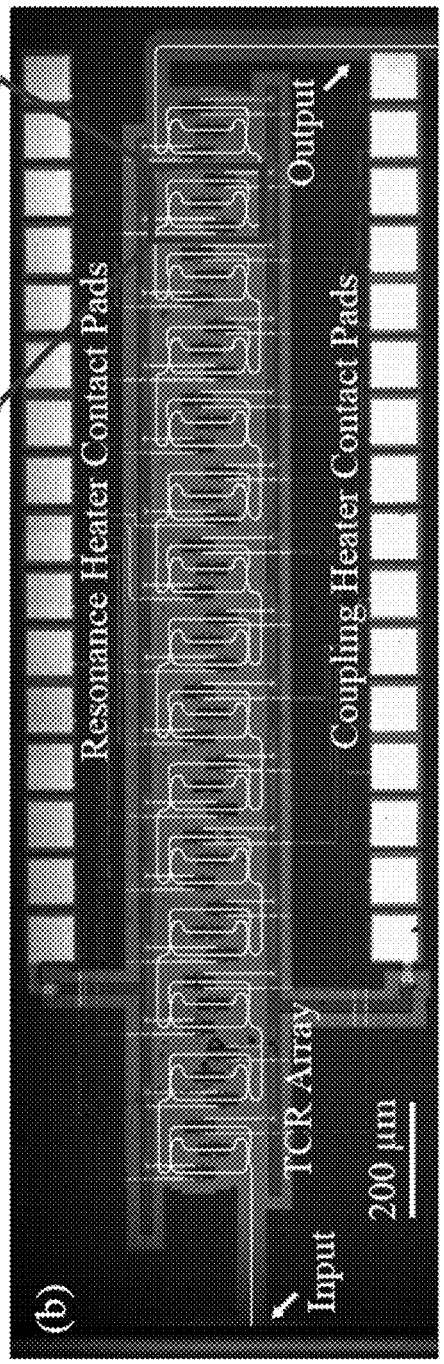
FIG. 7B shows an optical micrograph of a fabricated array of tunable ring resonators including 15 tunable ring resonators including the one shown in FIG. 7A.

FIG. 7A shows an optical micrograph of a fabricated tunable ring resonator schematically shown in FIG. 6. FIG. 7B shows an optical micrograph of a fabricated array including 15 tunable ring resonators. In these figures, device waveguides are traced in white on the micrographs for clarity.

The tunable array shown in FIG. 7B was fabricated using a silicon-on-insulator (SOI) process with a 200 mm SOI wafer, a 220 nm device layer, and a 2 μm buried oxide. 248 nm photolithography defined the resist patterns, based around 500 nm width waveguides. Top oxide was deposited on the chip, aluminum vias were defined through the oxide to access active devices on the device layers, and aluminum contact pads were written on the top oxide for contact to wire bonds or probes. Each ring contains three thermo-optic modulator heaters with a 130 kHz modulation bandwidth.

Figure 8:
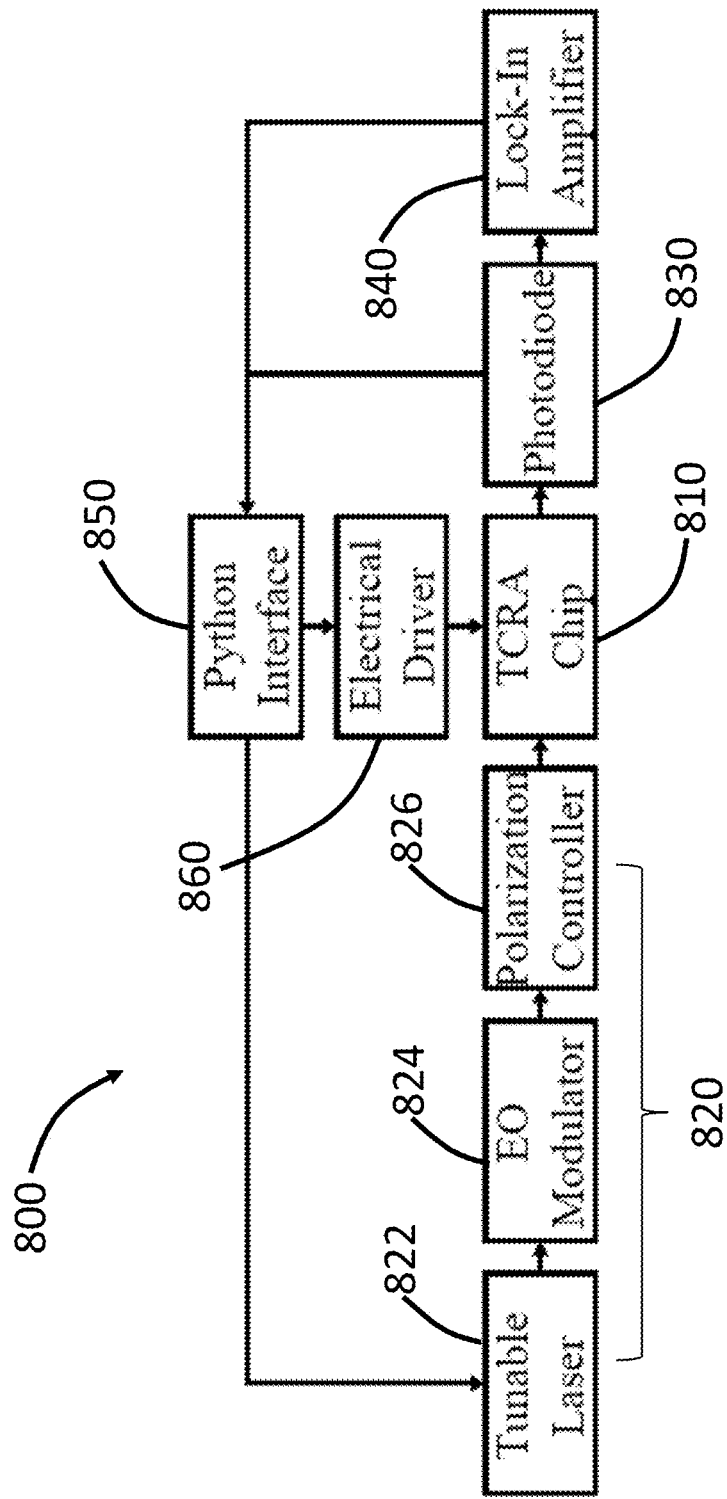
FIG. 8 shows a block diagram of a system for configuring phase settings of a tunable-coupling ring array so as to achieve a desired dispersion function.

FIG. 8 shows a block diagram of a system 800 that configures phase settings of a tunable-coupling ring array to achieve a desired dispersion function. The system 800 can also be used to characterize the tunable coupling ring array device. The system 800 includes a modulated laser source 820 to provide input signals to a chip 810 including the tunable array. The modulated laser source 820 further includes a tunable laser 822, an electro-optic modulator 824, and a polarization controller 826. The output signals of the chip 810 are read using a photodiode 830. In one example, the photodiode 830 can be integrated into the chip 810. In another example, the photodiode 830 can be off the chip. A lock-in amplifier 840 is used to convert the photodiode signal to a phase measurement. Both the photodiode signal (i.e., intensity reading) and the amplifier signal (i.e., phase reading) are transmitted to a controller 850 (e.g., a Python interface), which controls an electrical driver circuit 860 to change phase settings of the tunable array. The controller 850 can also control the modulated laser source 820 to sweep the output wavelength of the tunable laser 822.

The voltage across each of the 30 active heaters in the tunable array is dynamically controlled using the electrical driver 860, which is wire-bonded to the chip using a printed circuit board (PCB) and set through a Python user interface in the controller 850. The chip 810 is optically interfaced by coupling ultra-high-numerical-aperture (UHNA) fibers (not shown) to the input and output waveguides.

Figure 9:
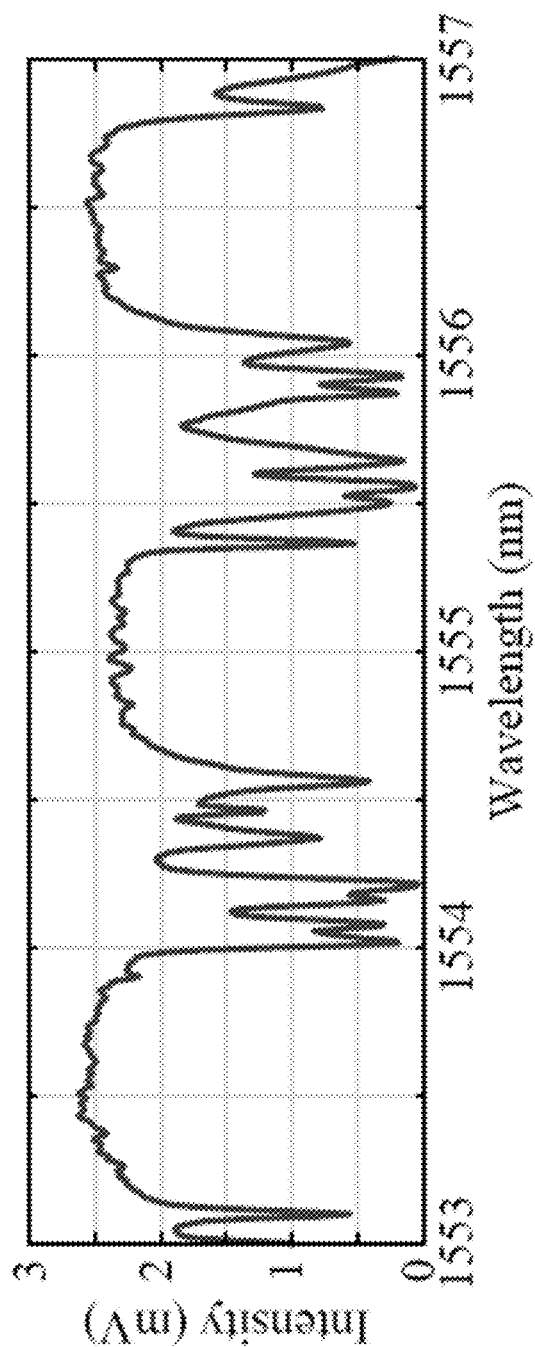
FIG. 9 shows a passive spectrum of a 15-ring tunable-coupling ring array device without external modulation.

FIG. 9 shows a passive spectrum of a 15-ring tunable-coupling ring array device without external modulation. The device exhibits many resonance dips with varying resonance frequencies and quality factors characteristic of a multi-ring untuned device. The spectrum indicates a working bandwidth of approximately 1.5 nm which is expected given the design ring length of about 430 μm.

FIGS. 10A and 10B show measured transmission of one tunable ring resonator as a function of wavelength for various resonance phase settings and various coupling phase settings, respectively. FIGS. 10C and 10D show measured group delay of one tunable ring resonator as a function of wavelength for various resonance phase settings and various coupling phase settings, respectively.

To characterize the functionality of the system, the resonance and coupling heater voltages were varied individually for one of the tunable-coupling rings in the array. FIGS. 10A and 10C show that increasing the voltage across the resonance heater shifts the ring's transmission dip to longer wavelengths. FIGS. 10B and 10D show that increasing the coupling heater voltage results in decreased coupling of the ring and a lower quality factor in addition to a slight resonance shift. By optimizing these coupling settings, quality factors over 150,000 for each ring in the system can be achieved. These quality factor settings result in about 20 dB of on-chip loss per a ring.

The group delay as a function of the coupling heater voltage as shown in FIG. 10D can be used to apply phase shifts of opposite signs. For example, the phase shift introduced by the heater at 2.8 V can be set as the baseline. In this case, applying 2.4 V on the heater can introduce a positive time delay τ of about 80 ps and applying 3.2 V on the heater can introduce a negative time delay of about −70 ps.

Using the controller 850, the 30 heater voltages on the tunable-coupling ring array device can be configured such that the device applies a desired frequency-dependent group delay to input signals. To perform this optimization, a constrained optimization by linear approximation (COBYLA) method can be used (available in the SciPy open-source Python package). The optimization takes as input a goal frequency-dependent group delay function. Then, within each optimization step, the controller 850 reads the current group delay by sweeping the tunable laser 822 and reading the signal from the lock-in amplifier 840. The controller 850 also compares this read signal to the goal group delay spectrum and sets the 30 heater voltages based on the COBYLA method. The method is complete once the goal group delay has been reached or a maximum number of optimization steps has been performed, whichever comes first.

Figure 11:
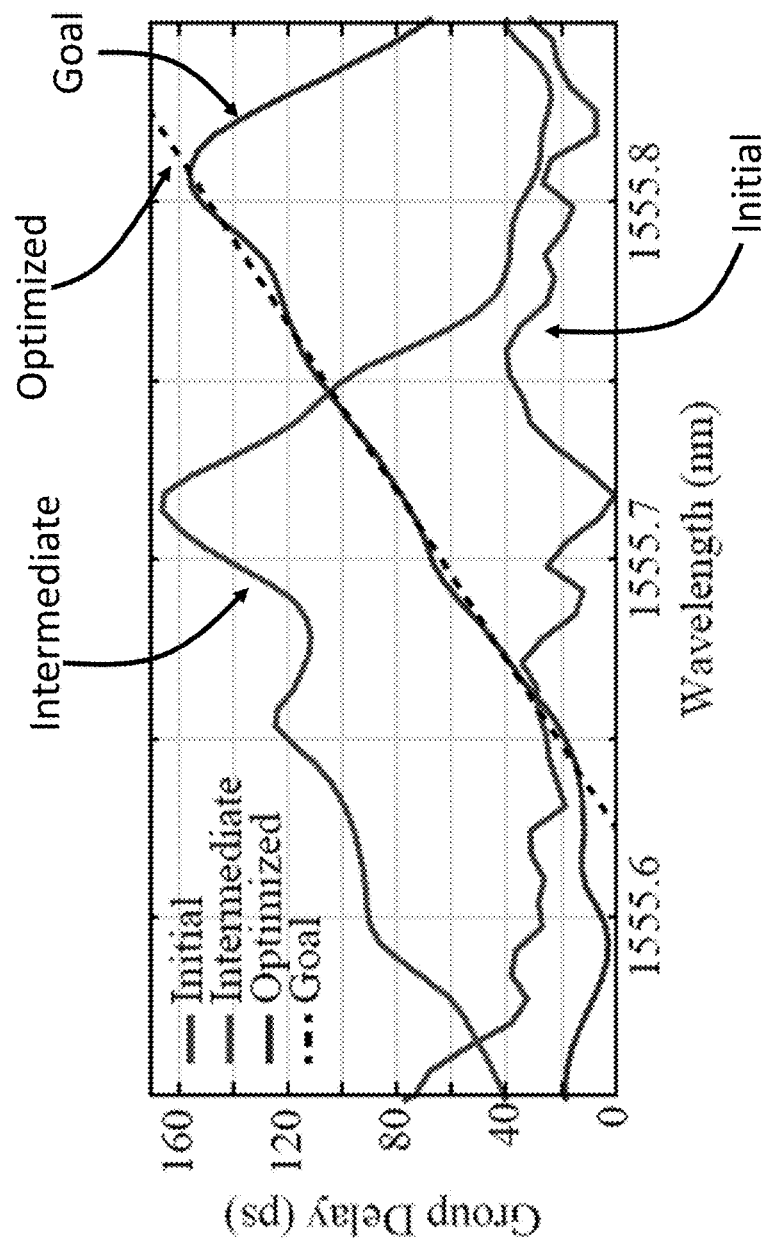
FIG. 11 illustrates configuration of a 15-ring tunable-coupling ring array device for an example goal group delay function.

FIG. 11 illustrates configuration of a 15-ring tunable-coupling ring array device for an example goal group delay function (shown as a dashed line). The plots in FIG. 11 show the goal and measured group delay spectra at various steps during the configuration. Initially, before configuration is performed on the heater voltages, the wavelength range of interest is within the passband of the device and no characteristic group delay is seen. As the device is configured, the group delay spectra begins to resemble a linear function as shown by intermediate plot in the middle of FIG. 11. When the configuration is complete, the resulting group delay plot closely follows the goal group delay function. Therefore, the configuration system 800 and the associated configuration procedure can be used to program a large-scale set of independent group delay spectra and, consequently, determine their corresponding heater voltage settings for a variety of high-dimensional classical and quantum applications.

Systems of Quantum Communication Using TCRAs

The programmable dispersion system as described above can be used for efficient and quantum-secure communications through quantum data locking. In particular, the system can be used for a temporal-mode-based "quantum enigma machine" protocol. The programmable circuit enables the protocol on-chip in a phase-stable, scalable, and fully-integrated way. A "quantum enigma machine" is a quantum optical cipher that utilizes quantum data locking to enable a relatively small key to encrypt and decrypt a much larger amount of data at the channel's transmitter and receiver, respectively. The protocol allows for faster and more efficient quantum-secure communications under practical conditions—channels secure to eavesdropping under noisy and lossy conditions.

Figure 12:
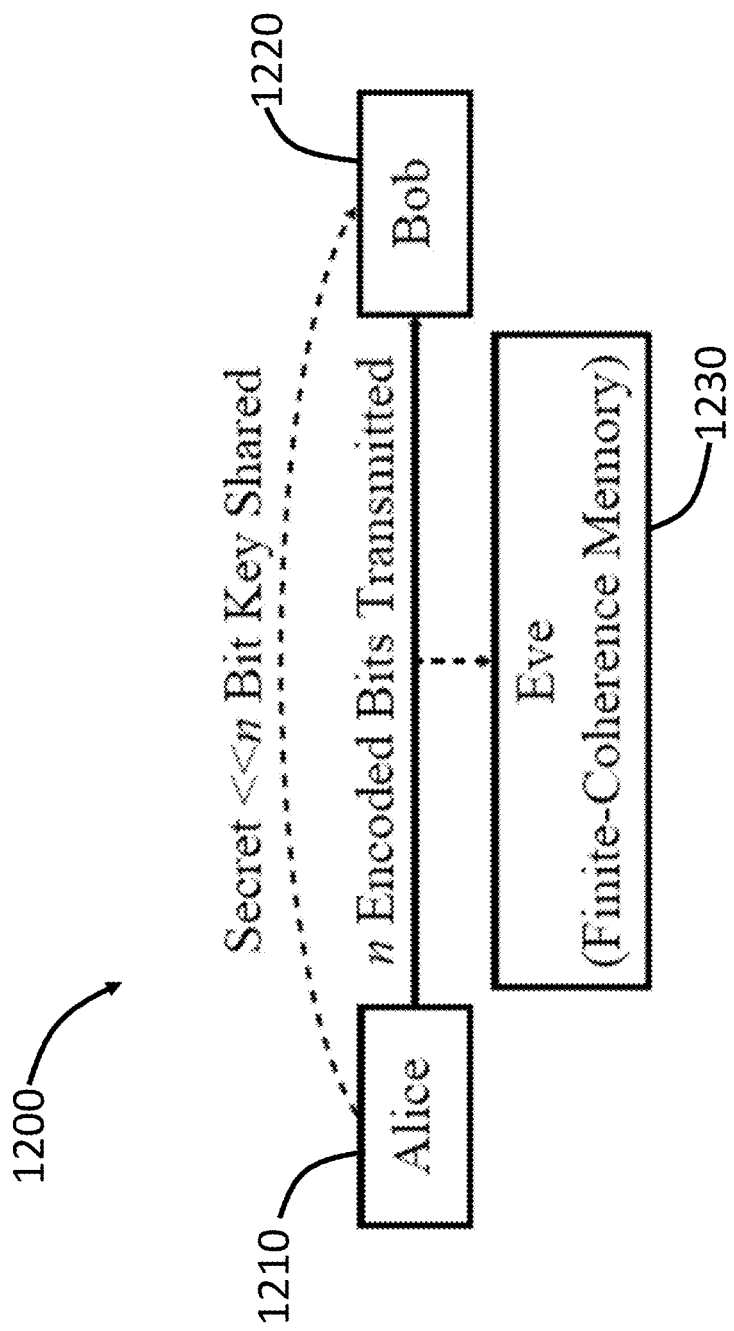
FIG. 12 shows a schematic of a quantum communication system using a quantum enigma machine protocol.

FIG. 12 shows a schematic of a quantum communication system 1200 using a quantum enigma machine protocol. The system 1200 includes a sender 1210 (usually referred to as Alice) and a receiver 1220 (usually referred to as Bob). The system 1200 may also include a possible eavesdropper 1230 (usually referred to as Eve). A relatively small key including m bits is shared between Alice and Bob. The small key is used to encode and decode n bits of a message, where m<<n. The protocol can guarantee composable security against the eavesdropper, Eve, with either a finite-coherence-time memory or no quantum memory at all.

It follows from classical information theory that secure encryption of n bits of classical information usually uses at least n classical bits of secret key. On the other hand, quantum data locking enables a key of length much shorter than n bits, which is shared a priori and secretly between Alice and Bob, to securely encrypt a substantially larger amount of data on the order of n bits. Quantum data locking can guarantee composable security under the condition that the eavesdropper is restricted to either a finite-coherence-time quantum memory or no quantum memory at all. Due to these less stringent secret key constraints and security under lossy and noisy conditions, the quantum enigma machine is an attractive approach for high-speed secure quantum communications. More details can be found in C. Lupo and S. Lloyd, "Quantum-locked key distribution at nearly the classical capacity rate," *Physical Review Letters*, 113, 160502 (2014); C. Lupo and S. Lloyd, "Quantum data locking for high-rate private communication," New Journal of Physics, 17, 033022 (2015); and C. Lupo, "Quantum data locking for secure communication against an eavesdropper with time limited storage," Entropy, 17, 3194-3204 (2015). Each of the above publications is hereby incorporated herein by reference in its entirety.

To realize such a system, a protocol can include coherently splitting a photon over multiple modes (e.g., temporal or spatial modes). The protocol also includes encoding the photon by applying independent, random phase shifts to each mode, and decoding the photon at the receiver using the corresponding inverse transformation. Compared to data locking methods that use Haar-distributed random unitaries, single unitaries with keys limited to a subset of qubits, or universal quantum computers, this scheme enables quantum data locking using standard linear optics, which greatly simplifies its implementation.

Figure 13:
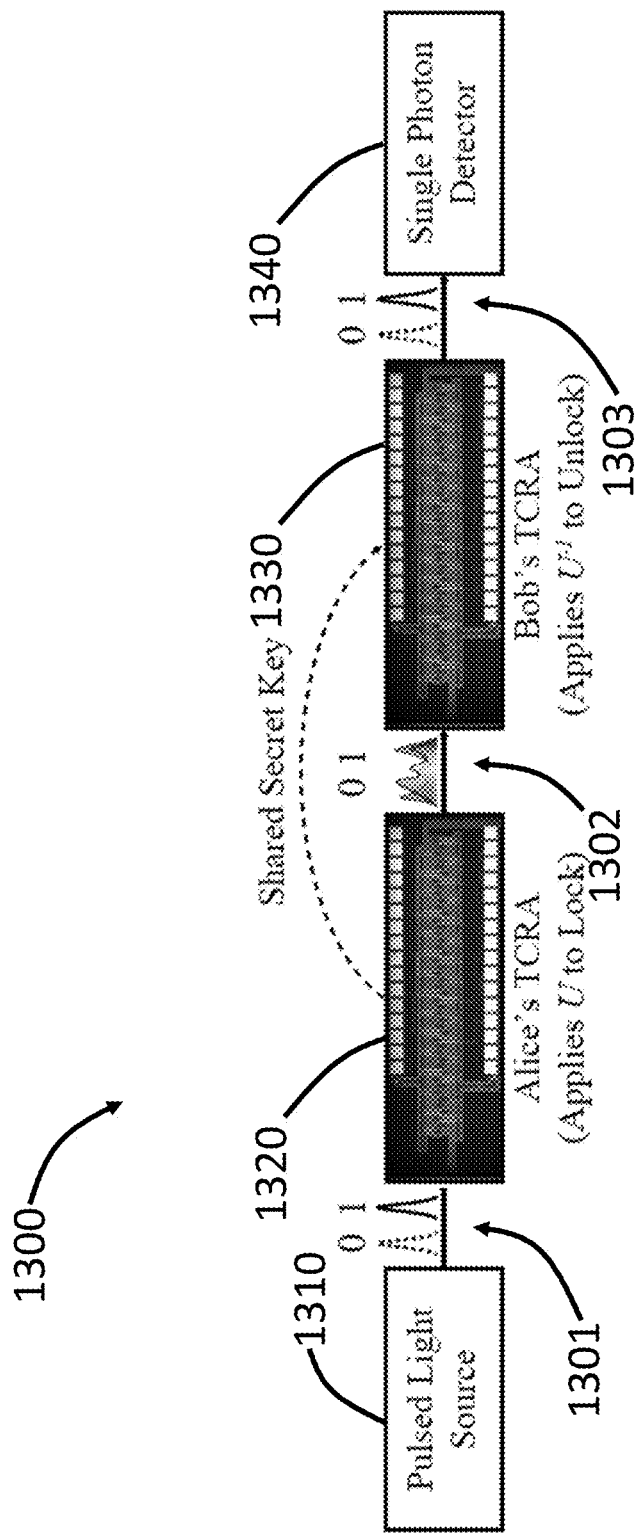
FIG. 13 illustrates a system of quantum communication using a tunable-coupling ring array.

FIG. 13 shows a schematic of a quantum communication system 1300 implementing quantum enigma machine protocol using the tunable-coupling ring array device. The system 1300 includes a pulsed light source 1310 to deliver input signals 1301. Photons in the input signals are prepared in a time domain basis and then scrambled (also referred to as locked) by a transmitter 1320 including a TCRA to produce scrambled signals 1302. The scrambled signals 1302 are transmitted over a public channel to Bob, who uses a receiver 1330 with another TCRA to unlock the scrambled signal 1302 and generate a recovered signal 1303. A single-photon detector 1340 is used to detect the recovered signal 1303. The TCRA settings in the transmitter 1320 and in the receiver 1330 for each transmission are determined using a secret pre-shared key and are known only to Alice and Bob.

Suppose Alice and Bob want to transmit n bits of information securely. In this protocol, Alice encodes the bits in photons coherently split over d time bins in a time domain basis. Therefore, each photon encodes $\log_2(d)$ bits of information and consequently only $p=n/\log_2(d)$ photons are used to transmit the n bit message.

To lock the information, Alice scrambles each photon using predetermined heater settings to apply an independent group-delay transformation, U, to each photon. On the receiving device, Bob applies the inverse group-delay transformation, $U^{-1}$, to undo the locking and recover the information. To lock and transmit the entire message, a total of p transformation settings (and their unlocking counterparts) can be used.

The order that these p transformations are applied can be picked from a list of k possible sequences where k has been proven to be O(2p) for guaranteed composable security. Therefore, Alice and Bob can secretly and a priori share a key of length p to know which one of the k sequences to pick and, consequently, which sequence of transformations (or inverse transformations) to apply.

In summary, using this quantum data locking protocol, only $p=n/\log_2(d)$ bits of secret key are used to securely transmit n bits of information. If d is sufficiently large (e.g., greater than 10), the number of necessary secret key bits becomes much smaller than the number of securely transmitted message bits. By integrating the quantum enigma machine transceivers on chip to enable these high-dimensional unitary transformations, the tunable coupling ring array device shows promise for enabling highly-efficient quantum-secure communications.

Although the intrinsic loss of the ring resonators in the photonic circuit may cause some loss in the overall system, any loss inside Alice's transmitter can be compensated by increasing the power of the coherent pump (as long as the mean-photon number per pulse exiting her setup is below unity). In addition, the loss in Bob's receiver chip can be factored into the overall channel loss and accounted for in the quantum enigma machine protocol.

Methods of Quantum Communication Using TCRAs

Figure 14:
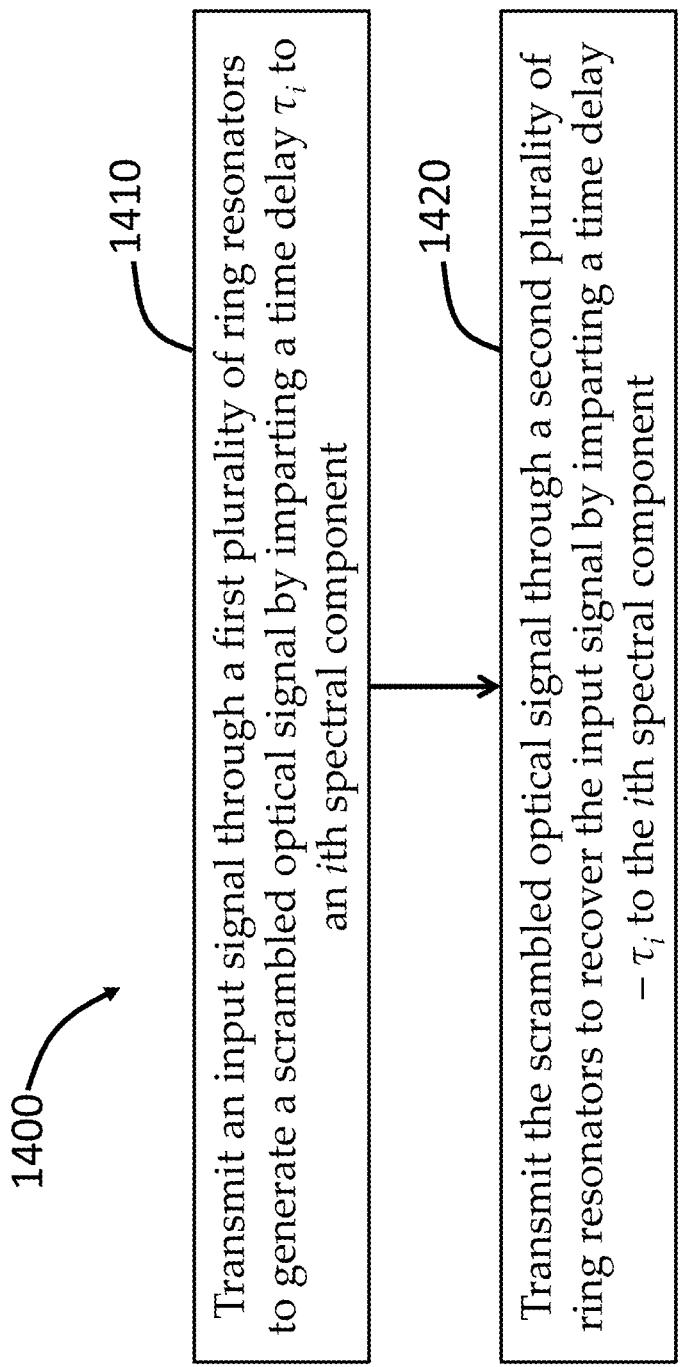
FIG. 14 illustrates a method of quantum communication using a tunable-coupling ring array.

FIG. 14 illustrates a method 1400 of quantum communication using TCRAs. The method includes, at 1410, transmitting an input signal through an array of ring resonators to generate a scrambled optical signal. The input signal has spectral components i=1, 2, . . . , N and N is a positive integer. The ith spectral component in the multiplicity of spectral components has an input wavelength $\lambda_i$. The resonant wavelengths of the ring resonators match the input wavelengths of the input signal, i.e., the ith ring resonator in the multiplicity of ring resonators has a resonant wavelength at $\lambda_i$. In this manner, the array of ring resonators, in collection, imparts a (distinct) time delay $\tau_i$ to each spectral component in the input signal.

The method 1400 also includes, at step 1420, transmitting the scrambled optical signal through a receiver, which also includes an array of ring resonators to recover the input signal. The array of ring resonators in the receiver causes a time delay $-\tau_i$ to the ith spectral component in the scrambled optical signal (see, e.g., FIG. 10D).

The method 1400 can further include changing the time delay $\tau_i$ applied to the ith spectral component in the input signal (at the transmitting end) using an ith coupling phase shifter in an ith MZI. The ith MZI couples the ith ring resonator to an input waveguide and includes two arms. The first arm of the MZI is optically coupled to the input waveguide and forms at least a portion of the ith ring resonator. The second arm is optically coupled to the input waveguide and includes the coupling phase shifter. The method 1400 can further include compensating for optical loss in the coupling phase shifter using a balancing phase shifter operably coupled to the first arm of the ith MZI. For example, the coupling shifter may introduce a loss IL and the balancing phase shifter can introduce a same amount of loss IL so as to balance the two arms of the MZI.

In the method 1400, the input signal can include multiple light pulses delivered by, for example, a pulsed laser source. Each light pulse is transmitted through the array of ring resonators using distinct phase settings (and accordingly a distinct transformation U). For example, a jth light pulse is transmitted through the array of ring resonators (on the transmitting end) using the jth input phase settings to generate a jth scrambled optical pulse, where j=1, 2, . . . M and M is the number of light pulses in the input signal and is a positive integer. On the receiver end, each scrambled optical pulse is recovered using a jth output phase setting of the array of ring resonator on the receiver.

In the method 1400, the input light can include p photons and each photon is coherently split into d distinct time bins. In this case, each photon encodes $\log_2(d)$ bits of information and consequently only $p=n/\log_2(d)$ photons are used to transmit the n bit message.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for quantum communication, the apparatus comprising:
 a light source to provide an input signal having a plurality of distinct spectral components, each photon in the input signal representing at least one photonic qubit encoded in a time domain basis;

an input waveguide, optically coupled to the light source, to guide the input signal; and a plurality of ring resonators, optically coupled to the input waveguide, to receive the input signal via the input waveguide, each ring resonator in the plurality of ring resonators having a resonant wavelength matching a wavelength of a corresponding distinct spectral component in the plurality of distinct spectral components, such that the plurality of ring resonators delays each distinct spectral component in the plurality of distinct spectral components by a distinct time delay.

2. The apparatus of claim 1, wherein the light source comprises:

a pulsed laser to provide a light pulse; and an encoder to coherently split each photon in the light pulse into a plurality of distinct time bins so as to encode the photon with the at least one photonic qubit.

3. The apparatus of claim 2, wherein the light pulse comprises p photons and the plurality of distinct time bins comprises d time bins so as to transmit information comprising n photonic qubits, where n=p $\log_2(d)$.

4. The apparatus of claim 1, wherein the plurality of ring resonators includes at least 10 ring resonators.

5. The apparatus of claim 1, wherein each ring resonator in the plurality of ring resonators is overcoupled to the input waveguide.

6. The apparatus of claim 1, wherein each ring resonator has a quality factor substantially equal to or greater than $10^5$.

7. The apparatus of claim 1, wherein each ring resonator in the plurality of ring resonators has an optical path length of about 200 μm to about 600 μm.

8. The apparatus of claim 1, wherein the distinct time delay is about 50 ps to about 300 ps.

9. The apparatus of claim 1, further comprising:

a plurality of first phase shifters, each first phase shifter in the plurality of phase shifters being coupled to a corresponding ring resonator in the plurality of ring resonators to change the resonant wavelength of the corresponding ring resonator; and a plurality of Mach-Zehnder interferometers (MZIs) to couple respective ring resonators in the plurality of ring resonators to the input waveguide, each MZI in the plurality of MZIs comprising:

a first arm optically coupled to the input waveguide and forming at least a portion of the corresponding ring resonator; and a second arm optically coupled to the input waveguide, the second arm having a second phase shifter to change the distinct time delay to the distinct spectral component in the input signal.

10. The apparatus of claim 9, wherein each MZI further comprises a third phase shifter operably coupled to the first arm to balance optical loss in the second phase shifter.

11. A system for quantum communication, the system comprising:

a transmitter comprising:

an input waveguide to guide an input signal having a plurality of spectral components, an ith spectral component in the plurality of spectral components having an input wavelength $\lambda_i$, where i=1, 2, ..., N and N is a positive integer; and a first plurality of ring resonators, optically coupled to the input waveguide, to generate a scrambled optical signal from the input signal, an ith ring resonator in the first plurality of ring resonators having a resonant wavelength $\lambda_i$ such that the first plurality of ring resonators imparts a time delay $\tau_i$ to the ith spectral component in the input signal so as to generate the scrambled optical signal;

a receiver, in optical communication with the transmitter, to receive the scrambled optical signal, the receiver comprising a second plurality of ring resonators to impart a time delay $-\tau_i$ to the ith spectral component in the scrambled optical signal so as to recover the input signal.

12. The system of claim 11, wherein the first plurality of ring resonators includes at least 10 ring resonators.

13. The system of claim 11, wherein each ring resonator in the first plurality of ring resonators is overcoupled to the input waveguide.

14. The system of claim 11, further comprising:

a first plurality of phase shifters, an ith phase shifter in the first plurality of phase shifters being coupled to the ith ring resonator in the first plurality of ring resonators to change the resonant wavelength $\lambda_i$; and a plurality of Mach-Zehnder interferometers (MZIs) to couple the first plurality of ring resonators to the input waveguide, an ith MZI comprising:

a first arm optically coupled to the input waveguide and forming at least a portion of the ith ring resonator; and a second arm optically coupled to the input waveguide, the second arm having a coupling phase shifter to change the time delay z, to the ith spectral component in the input signal.

15. The system of claim 14, wherein the ith MZI further comprises a balancing phase shifter operably coupled to the first arm to balance optical loss in the coupling phase shifter.

16. The system of claim 11, further comprising:

a pulsed laser to provide a light pulse comprising p photons; and an encoder to coherently split each photon in the light pulse into d time bins so as to transmit information comprising n bits, where n=p $\log_2(d)$.

17. The system of claim 11, further comprising:

a single-photon detector, in optical communication with the receiver, to detect the input signal recovered by the receiver.

18. A method of quantum enigma, the method comprising:

transmitting an input signal through a first plurality of ring resonators to generate a scrambled optical signal, the input signal having a plurality of spectral components, an ith spectral component having an input wavelength $\lambda_i$, where i=1, 2, ..., N and N is a positive integer, an ith ring resonator in the first plurality of ring resonators having a resonant wavelength at $\lambda_i$ such that the first plurality of ring resonators imparts a time delay $\tau_i$ to the ith spectral component in the input signal.

19. The method of claim 18, further comprising:

transmitting the scrambled optical signal through a second plurality of ring resonators to recover the input signal, the second plurality of ring resonators causing a time delay $-\tau_i$ to the ith spectral component in the scrambled optical signal.

20. The method of claim 18, further comprising:

changing the time delay $\tau_i$ to the ith spectral component in the input signal using an ith coupling phase shifter in an ith MZI, the ith MZI coupling the ith ring resonator to an input waveguide and comprising:

a first arm optically coupled to the input waveguide and forming at least a portion of the ith ring resonator; and a second arm optically coupled to the input waveguide, the second arm having the coupling phase shifter.

21. The method of claim 20, further comprising:
compensating for optical loss in the coupling phase shifter using a balancing phase shifter operably coupled to the first arm of the ith MZI.

22. The method of claim 18, wherein:
the input signal comprises a plurality of light pulses,
transmitting the input signal comprises transmitting a jth light pulse in the plurality of light pulses into the first plurality of ring resonators using a jth input phase setting of the first plurality of ring resonators to generate a jth scrambled optical pulse, where j=1, 2, ... M and M is a positive integer, and the method further comprising:
transmitting the jth scrambled optical pulse into a second plurality of ring resonators using a jth output phase setting of the second plurality of ring resonator so as to recover the jth light pulse.

23. The method of claim 18, further comprising:
providing a light pulse comprising p photons; and
coherently splitting each photon in the light pulse into d distinct time bins so as to transmit information comprising n bits, where $n = p \log_2(d)$.

* * * * *